(12) United States Patent
An

(10) Patent No.: US 11,293,489 B2
(45) Date of Patent: Apr. 5, 2022

(54) BEARING CAGE AND USE THEREOF

(71) Applicant: Aktiebolaget SKF, Gothenburg (SE)

(72) Inventor: Hongyuan An, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/921,155

(22) Filed: Jul. 6, 2020

(65) Prior Publication Data

US 2021/0018043 A1 Jan. 21, 2021

(30) Foreign Application Priority Data

Jul. 17, 2019 (CN) .......................... 201910644247.X

(51) Int. Cl.
| | | |
|---|---|---|
| *F16C 33/41* | (2006.01) | |
| *F16C 33/38* | (2006.01) | |
| *F16C 19/16* | (2006.01) | |

(52) U.S. Cl.
CPC ............ *F16C 33/418* (2013.01); *F16C 19/16* (2013.01); *F16C 33/3887* (2013.01)

(58) Field of Classification Search
CPC ..... F16C 33/418; F16C 33/3887; F16C 19/16
See application file for complete search history.

(56) References Cited

U.S. PATENT DOCUMENTS

| | | | | |
|---|---|---|---|---|
| 8,876,395 | B2* | 11/2014 | Sakaguchi | F16C 33/3887 384/531 |
| 9,097,282 | B2* | 8/2015 | Adane | F16C 33/416 |
| 2011/0002568 | A1* | 1/2011 | Kawamura | F16C 33/6629 384/470 |
| 2011/0142388 | A1* | 6/2011 | Maejima | F16C 33/6674 384/523 |
| 2018/0223906 | A1* | 8/2018 | Kamamoto | F16C 33/416 |

FOREIGN PATENT DOCUMENTS

JP        2008190629 A   *   8/2008   ............ F16C 33/418

OTHER PUBLICATIONS

Machine Translation of JP-2008190629-A (Year: 2008).*

* cited by examiner

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A one-way snap-in bearing cage providing a substantially annular backbone, and a hanging-out portion extending from the backbone to one axial side, the hanging-out portion having pockets, which are distributed at intervals in a circumferential direction and used to accommodate spherical rollers, and pocket connections for connecting adjacent pockets. The pocket, at least in the vicinity of a radial inner edge at an opening side of the pocket, employs an expanding design achieving remoteness from a surface of the roller.

10 Claims, 7 Drawing Sheets

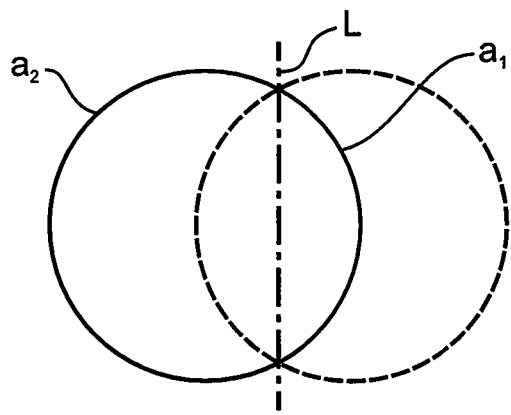
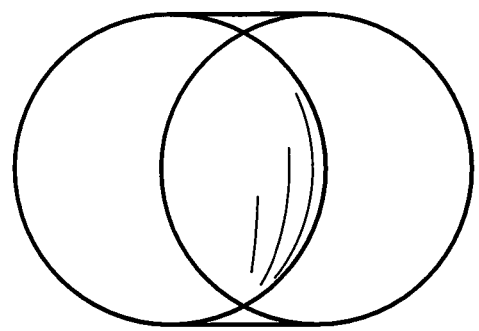
Fig. 3a        Fig. 3b
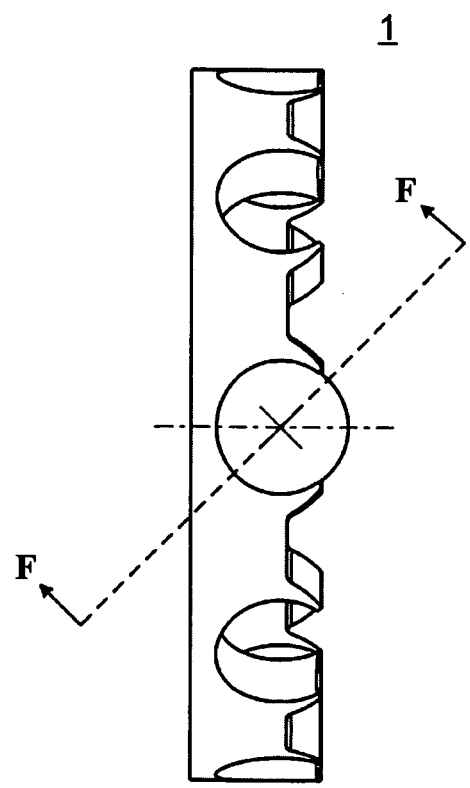
Fig. 4

F - F

BEARING CAGE AND USE THEREOF

CROSS-REFERENCE TO RELATED APPLICATIONS

This application claims priority to Chinese Patent Application number 201910644247.X, filed Jul. 17, 2019, the contents of which is fully incorporated herein by reference.

TECHNICAL FIELD

The present invention relates to a one-way snap-in bearing cage, and a roller bearing using such a cage.

BACKGROUND ART

One-way snap-in cages have become a conventional configuration in roller bearings on account of their low cost and ease of installation. As shown in FIGS. 1 and 2, a typical one-way snap-in cage 1 is divided axially into a substantially annular backbone 10 and a hanging-out portion 20 which extends from the backbone 10 to one axial side. The hanging-out portion 20 comprises pockets 22, which are distributed at intervals in a circumferential direction and used to accommodate spherical rollers 21, and pocket connections 24 which connect adjacent pockets. Corresponding to the spherical rollers, a conventional cage uses spherical pockets, which have a diameter slightly greater than that of the rollers, so that the pocket and the roller form a covered clearance fit. This type of fit not only facilitates the fitting of the rollers, but is also conducive to the formation of a stable lubricating oil film between the pocket and the roller. The pockets 22 form prongs 26 at an opening side thereof; the prongs protrude axially beyond the pocket connections 24. In other words, the pocket connections 24 "retract into" a tip range of the prongs 26 in an axial direction; this can reduce the mass of the hanging-out portion, and thereby reduce the action of centrifugal force.

An inherent drawback of snap-in cages is that as the rotation speed increases, the hanging-out portion tends to deform by expanding outwards under the action of centrifugal force, forming the so-called "umbrella effect". The umbrella effect destroys the matching relationship between the pocket and the roller, giving rise to interference between the pocket and the roller, and thereby causing local overheating of the cage, and even local melting. More seriously, the interference is likely to occur at a radial inner edge 28 of an opening-side inner wall of the cage, and the contact force at this position is likely to cause deformation of the cage as a whole; in serious cases, this will cause the cage to come off the rollers.

To solve the abovementioned technical problem, existing solutions generally expand the pocket diameter to increase the gap between an inner surface of the pocket and the roller, thereby avoiding interference between the cage (especially at the radial inner edge of the prongs thereof) and the rollers. However, this type of solution will have a number of adverse consequences, including: slackness of fit between the cage and the rollers, such that the cage easily comes off the rollers; and in the case where axial space of the bearing is limited, increasing the pocket diameter will "compress" the axial dimension of the backbone, thereby weakening the overall rigidity of the backbone.

SUMMARY OF THE INVENTION

The present invention is directed at the technical problem of interference occurring between a one-way snap-in bearing cage and a roller under the action of the umbrella effect. To solve the abovementioned problem, the present invention provides a one-way snap-in cage, comprising a substantially annular backbone and a hanging-out portion extending from the backbone to one axial side. The hanging-out portion comprises pockets, which are distributed at intervals in a circumferential direction and used to accommodate spherical rollers, and pocket connections for connecting adjacent pockets. The pocket, at least in the vicinity of a radial inner edge of an opening-side inner wall thereof, employs an expanding design achieving remoteness from a roller surface. When the umbrella effect occurs, this expansion structure can to a certain extent avoid interference between an inner wall lower edge at the opening side of the pocket and the roller, thereby helping to avoid the various problems caused by the umbrella effect in the prior art.

Based on the cage described above, the present invention further provides a roller bearing, comprising an inner race, an outer race, and at least one line of rollers disposed between the inner and outer races. The cage is disposed on the at least one line of rollers. The roller bearing employing the cage described above can adapt to higher rotation speeds, and can also significantly reduce the temperature increase effect under identical rotation speed conditions, thus having a marked rotation speed advantage and good application prospects.

Various embodiments and beneficial effects of the present invention are described in detail below in conjunction with the drawings.

BRIEF DESCRIPTION OF THE DRAWINGS

FIGS. 3a and 3b are geometric schematic diagrams showing the mechanism of formation of a toroidal surface.

FIG. 4 is a radial perspective view of the toroidal-surface pocket cage of the present invention.

DETAILED DESCRIPTION OF SEVERAL EMBODIMENTS

Figure 1:
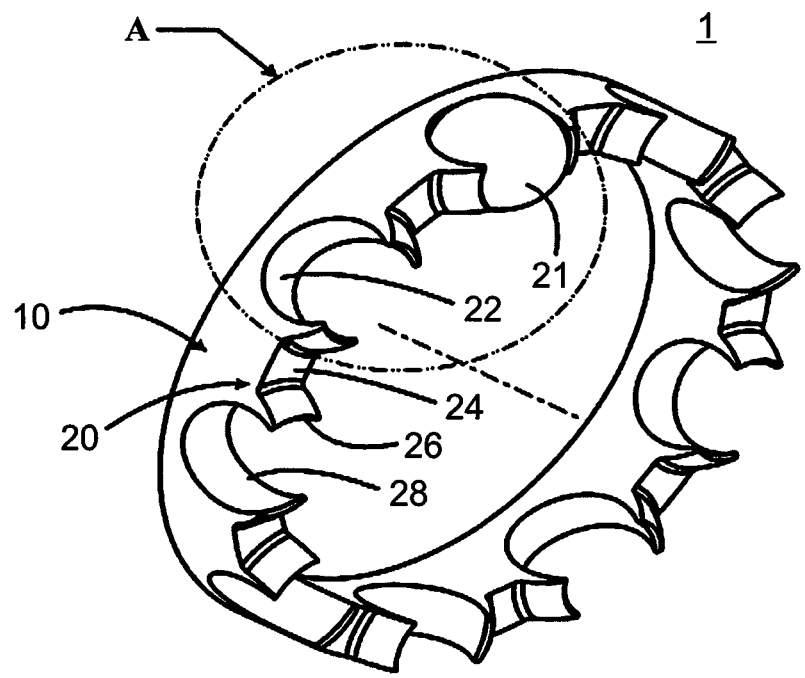
FIG. 1 is a three-dimensional perspective view of a conventional spherical-surface pocket cage according to the prior art.
Figure 2:
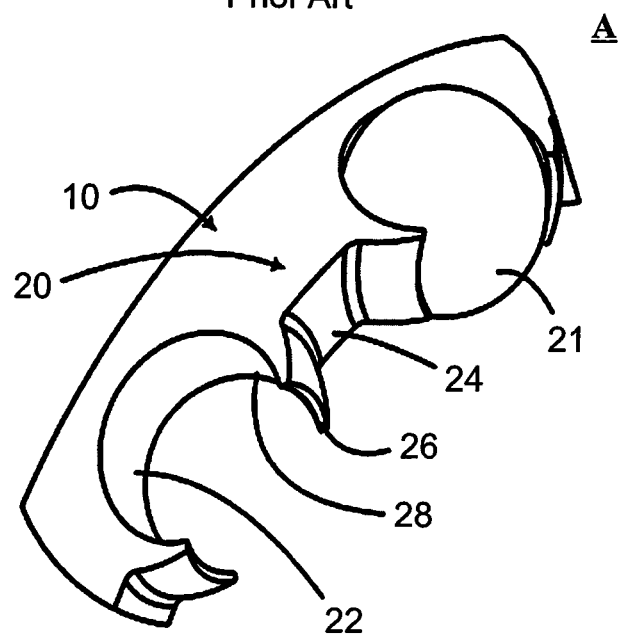
FIG. 2 is a partial enlarged drawing of region A in FIG. 1.

For convenience of description, the direction indicated by the axis of the bearing in the present invention (the dotted line in FIGS. 1 and 4) is defined as the "axial direction", and a direction perpendicular to the axis is defined as the "radial direction". Furthermore, in the drawings, a ball centre of the roller is shown as being located at the geometric centre of the pocket; this is done to facilitate observation of the present invention, and does not deliberately show that the roller is always located at the geometric centre of the pocket when the bearing is in an operating state in the present invention. Various embodiments of the present invention are described in detail below in conjunction with the drawings, wherein all identical or similar components have been given identical reference labels.

As stated above, the place where interference is most likely to occur between the cage and the roller is located close to the radial inner edge of the opening-side inner wall of the pocket; this is marked with the label 28 in the drawings, and is also called the "inner wall lower edge" hereinbelow. This is because, constrained by the backbone, the extent of deformation by outward expansion of the hanging-out portion of the cage is greater at the opening side of the pocket than in the vicinity of the backbone, so positions of interference between the pocket and the roller are relatively concentrated in the vicinity of the inner wall lower edge at the opening side of the pocket. Theoretically, the inner wall lower edge covers a certain range in both the axial and radial directions of the bearing. This is because the umbrella effect is positively correlated with the rotation speed of the bearing; at different rotation speeds, the positions of contact between the roller and the opening-side inner wall of the pocket are not exactly the same. Thus, the region of interference should be the set of positions where the inner wall of the pocket actually interferes with the roller under the umbrella effect, and these positions are relatively concentrated in the vicinity of the position of the inner wall lower edge at the opening side of the pocket.

To eliminate the adverse consequences of interference between the radial inner edge of the pocket inner wall and the roller, the design of the present invention uses a toroidal-surface pocket cage. The toroidal surface is a geometric concept, specifically a curved surface in space that is obtained by rotating a plane circle about a chord on the circle through one revolution. FIGS. 3a and 3b are geometric schematic diagrams showing the mechanism of formation of the toroidal surface. It can be seen from the figures that the toroidal surface formed may be divided into two parts: one part is formed by rotation of a minor arc a1 of arc length smaller than a semicircle about the chord L, and has a shape similar to a rugby ball; the other part is formed by rotation of a major arc a2 of arc length greater than a semicircle about the chord L, and has a shape similar to a pumpkin. The toroidal-surface pocket of the present invention uses a toroidal surface of the former shape. It is pointed out in passing that the circle which forms the toroidal surface is defined as the "cross-sectional circle" in the present invention, and the chord L is defined as the "rotation axis" in the present invention.

Figure 5:
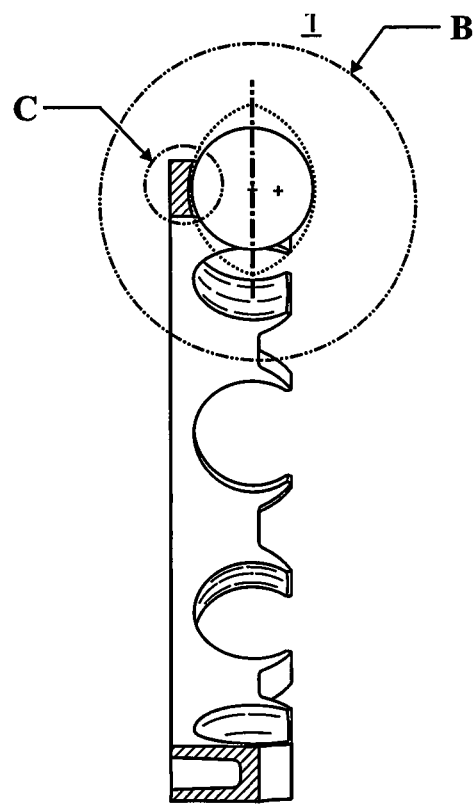
FIG. 5 is a radial cross-sectional view of the toroidal-surface pocket cage of the present invention.
Figure 6:
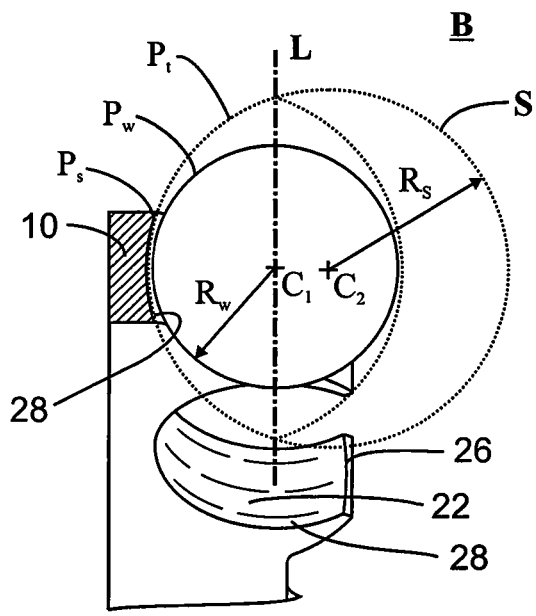
FIG. 6 is a partial enlarged drawing of region B in FIG. 5.
Figure 7:
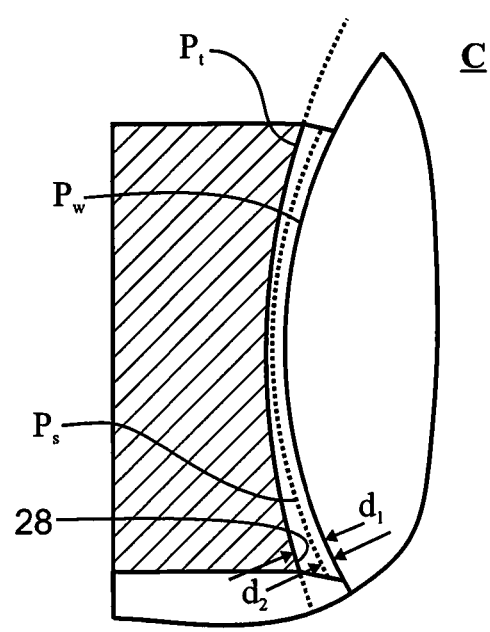
FIG. 7 is a partial enlarged drawing of region C in FIG. 5.

FIG. 4 is a three-dimensional perspective view of the toroidal-surface pocket cage of the present invention from a radial perspective. FIGS. 5-7 are a radial cross-sectional view of the cage of the present invention, and partial enlarged drawings thereof, respectively. In order to show the difference between the toroidal-surface pocket and a spherical-surface pocket, respective (virtual) profiles or surfaces $P_w$, $P_s$ and $P_t$ of the roller, the spherical-surface pocket and the toroidal-surface pocket are simultaneously shown in FIGS. 6 and 7. It can be seen from the figures that the surface profile $P_t$ of the toroidal-surface pocket is formed by rotating a cross-sectional circle S of larger radius than the spherical-surface pocket surface profile $P_s$ around a rotation axis L; the rotation axis L passes through the geometric centre $c_1$ of the pocket (shown in the figures as coinciding with the ball centre of the roller) in a radial direction, but does not pass through the circle centre $c_2$ of the cross-sectional circle. It can also be seen from FIG. 7 that the distance $d_1$ between the surface profile $P_t$ of the toroidal-surface pocket and the roller surface $P_w$ at the radial inner edge 28 close to the backbone side is far greater than the distance $d_2$ between the surface profile $P_s$ of the conventional spherical pocket and the roller surface $P_w$ at the same position.

Figure 8:
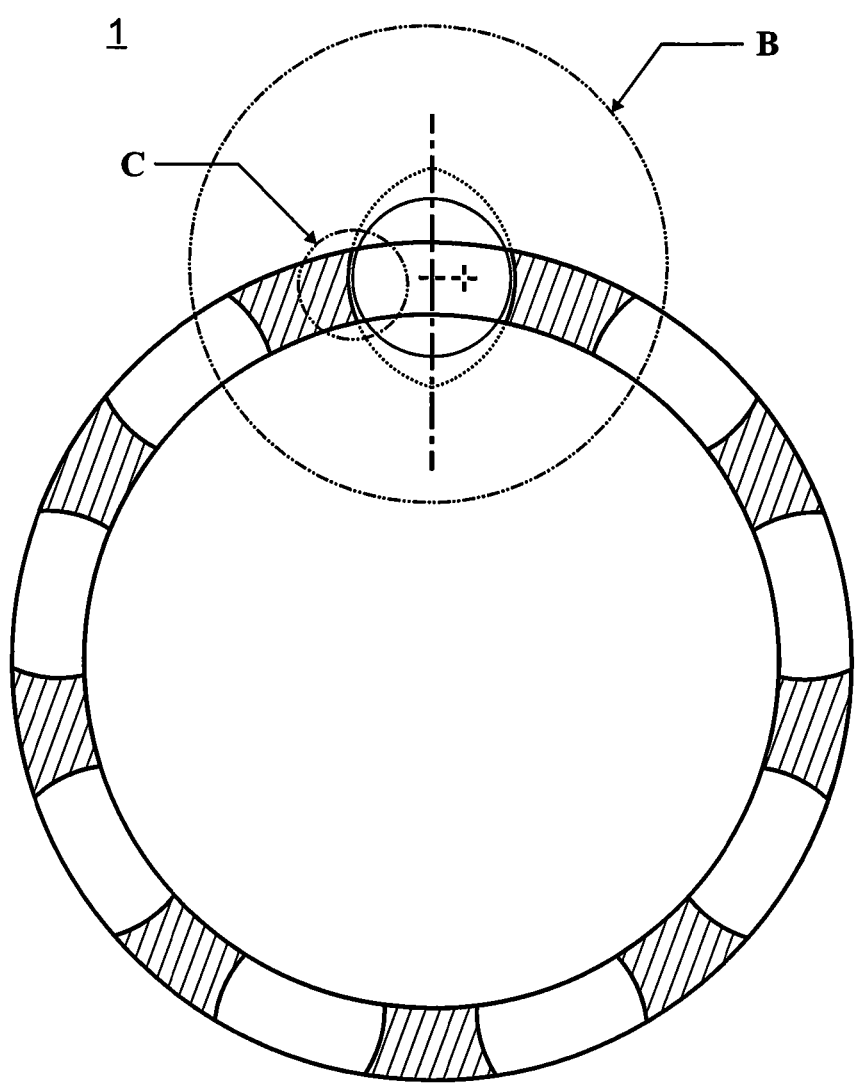
FIG. 8 is a cross-sectional drawing of a plane determined by the geometric centres of all the pockets on the cage.
Figure 9:
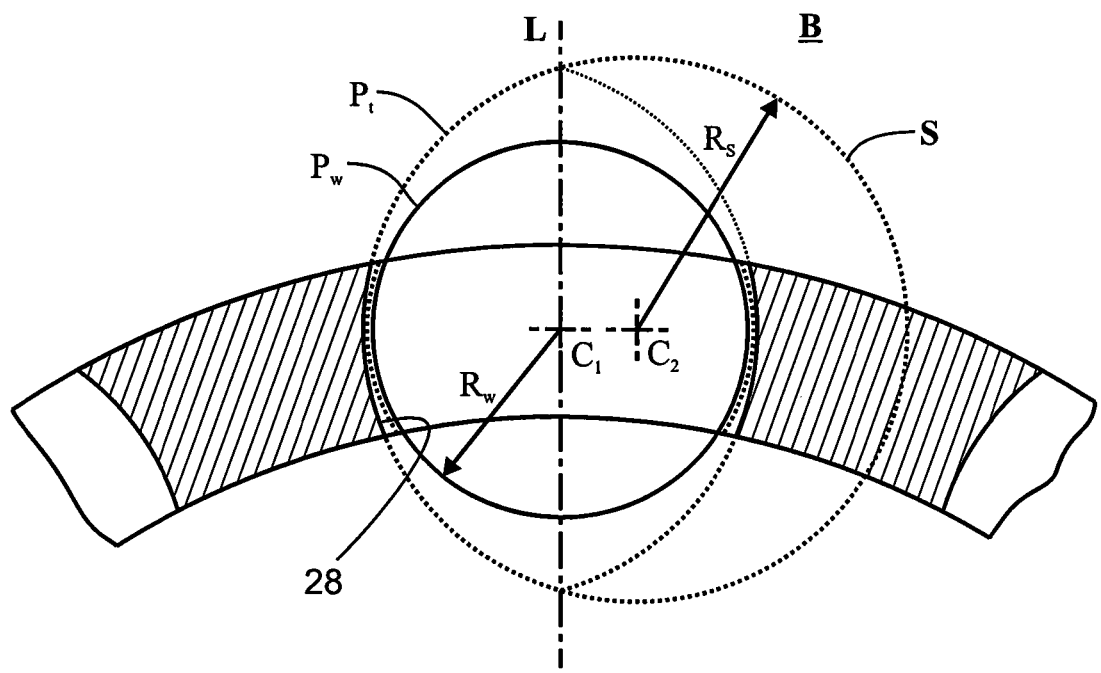
FIG. 9 is a partial enlarged drawing of region B in FIG. 8.
Figure 10:
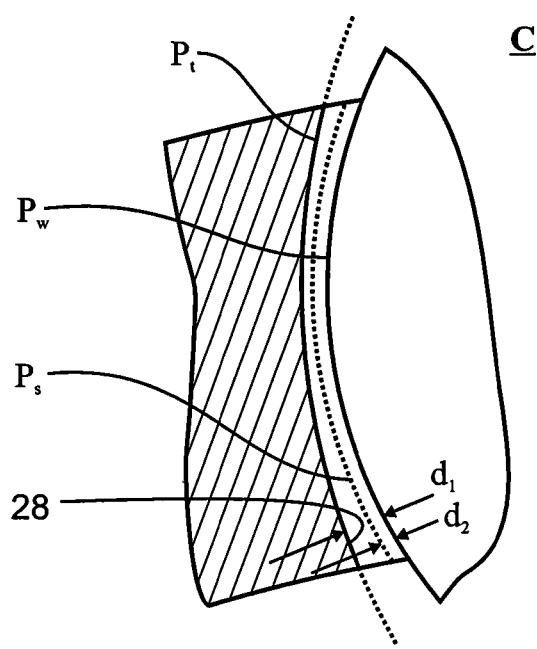
FIG. 10 is a partial enlarged drawing of region C in FIG. 8.
Figure 11:
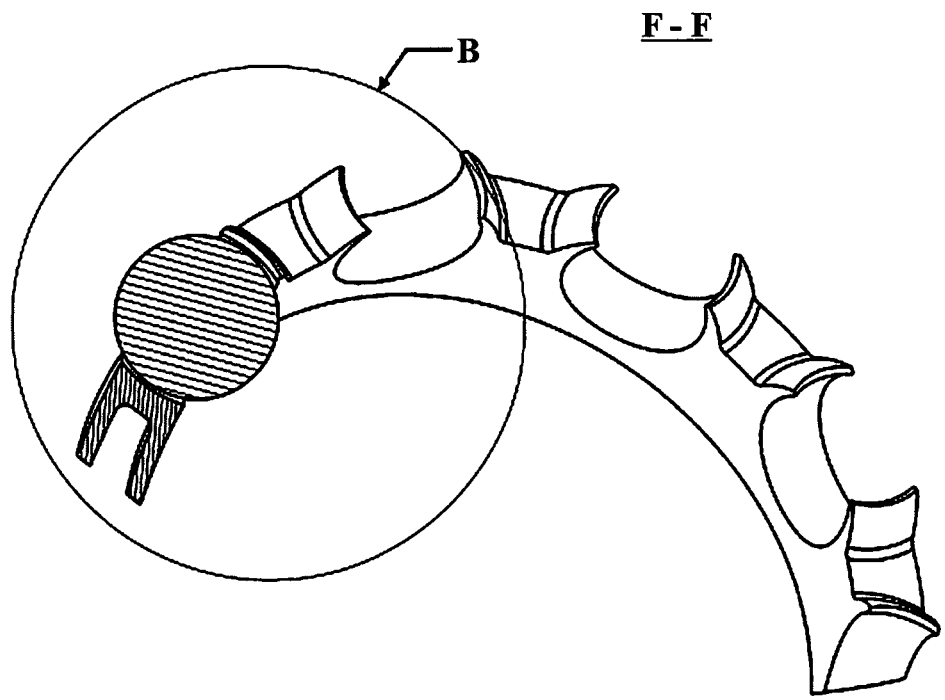
FIG. 11 is a cross-sectional drawing of the cage, taken along direction F-F in FIG. 4.
Figure 12:
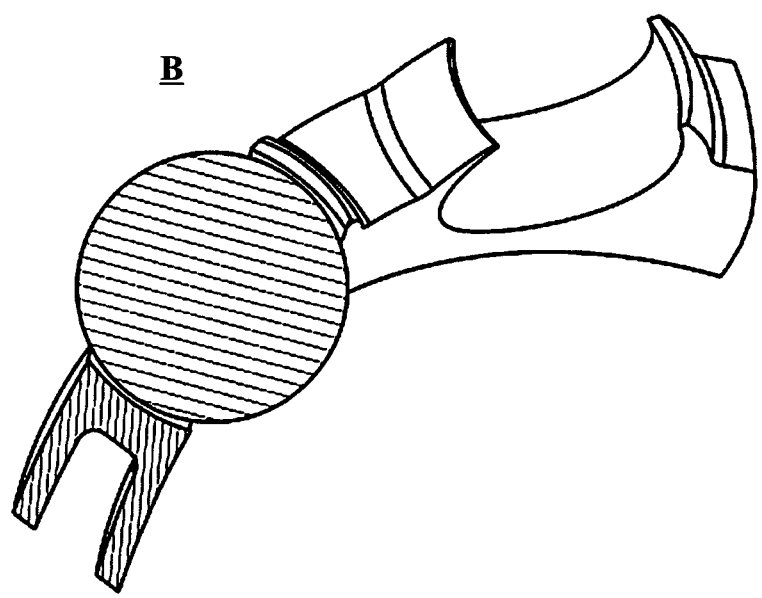
FIG. 12 is a partial enlarged drawing of region B in FIG. 11.

The same situation exists at other radial inner edge positions of the pocket inner wall around the roller. FIGS. 8-10 show a cross-sectional drawing and partial enlarged drawings of the toroidal-surface pocket from an axial perspective; the cross section is jointly determined by the geometric centres of all the pockets. It can be seen from the figures that the distance $d_1$ between the radial inner edge of the pocket and the roller surface is far greater than the gap $d_2$ between the conventional spherical-surface pocket and the roller. FIGS. 11 and 12 are a cross-sectional drawing and a partial enlarged drawing of the cage, taken along direction F-F in FIG. 4. It can be seen from the figures that the distance between the roller surface and the toroidal-surface pocket at the radial inner edge at the opening side thereof is likewise far greater than the distance between the conventional spherical-surface pocket and the roller (not marked in the figures).

FIGS. 4-12 above show from different angles and positions how the inner wall of the pocket, at least at the radial inner edge thereof, forms an expansion structure achieving remoteness from the roller surface, thereby increasing the gap between itself and the roller surface, such that the gap is at least greater than the distance between the conventional spherical-surface pocket and the roller. It is not difficult to imagine that when the umbrella effect occurs, the inner wall lower edge of the pocket will move upwards radially, pressing close to the surface of the roller; moreover, the effect of pressing close will become more obvious as the opening side of the pocket is approached (not shown). Relative to the spherical-surface pocket, the toroidal-surface pocket has an outwardly expanding form overall, being designed such that the distance between itself and the roller surface steadily increases, and therefore when the umbrella effect occurs, the radial inner edge thereof is less likely to come into contact with the roller surface as compared with the conventional spherical-surface pocket. Thus, the pocket with the toroidal-surface design can effectively avoid the problem of interference occurring between the conventional spherical-surface pocket and the roller under the umbrella effect, and the various adverse consequences arising therefrom.

It can also be seen from FIGS. 6 and 9 that the larger the cross-sectional circle S forming the toroidal-surface pocket, the larger the gap $d_1$ between the radial inner edge of the pocket and the roller, and the less likely the problem of interference caused by the umbrella effect is to occur. Despite this, it is not true that the larger the cross-sectional circle forming the toroidal-surface pocket, the better. This is because, as the diameter of the cross-sectional circle is increased, the degree to which the toroidal-surface pocket and the roller are fitted to each other in shape gradually decreases, and this is likely to cause impairment of the lubrication effect and an increase in vibration noise. Thus, the cross-sectional circle forming the toroidal-surface pocket should have a suitable range. Within this range, the numerous problems caused by the umbrella effect can be effectively overcome, without resulting in impairment of the fit between the pocket and the roller due to an excessively large cross-sectional circle.

Experiments show that the radius $R_s$ of the cross-sectional circle forming the toroidal-surface pocket (see FIGS. 6 and 9) should be within a range of 1.08-10 times the roller radius $R_w$. In a preferred embodiment, the radius $R_s$ of the cross-sectional circle should be within a range of 1.15-5 times the roller radius $R_w$. In a further preferred embodiment, the radius $R_s$ of the cross-sectional circle should be within a range of 1.25-1.6 times the roller radius $R_w$. The toroidal-surface pocket within the abovementioned size range can adapt to different degrees of umbrella effect, and also has good heat dissipation performance, being especially suitable for roller bearings with medium and high rotation speeds.

The inner surface of the cage pocket described above employs a toroidal-surface design overall, the core idea thereof being to cause the radial inner edge of the pocket to be farther away from the roller surface as compared with the conventional spherical-surface pocket, thereby overcoming the problem of interference which the umbrella effect might cause. It is not difficult to understand that other different technical solutions may be derived from the same idea, without any limitation to the embodiment in which the toroidal-surface pocket is used overall. For example, pockets of various forms, including spherical surfaces and toroidal surfaces, can be subjected to local correction such that a locally outward-expanding form structure is formed close to the radial inner edge thereof, and the technical effect of being remote from the roller surface locally can be achieved in each case. To summarize, a pocket curved surface in any form can achieve the object of the present invention, as long as a region close to the radial inner edge thereof is farther away from the roller surface than the remaining part of the pocket curved surface.

Specifically, the radial inner edge of the pocket may locally employ a design featuring a conical surface, toroidal surface or spherical surface in an expanding form, or a curved surface in any other form, as long as this part of the curved surface is farther away from the roller surface than the rest of the pocket surface, and forms an effective continuation of the rest of the surface. Taking a spherical-surface form as an example, the pocket may comprise a spherical-surface pocket lower edge, having a larger radius of curvature, forming a forward continuation of the rest of the pocket curved surface, which has a smaller radius of curvature (the cross section typically being shown as two internally tangent circles), and may also comprise a spherical-surface pocket lower edge, having any radius of curvature, forming a reverse continuation of the remaining part of the pocket curved surface (the cross section typically being shown as two externally tangent circles). The abovementioned method not only causes the radial inner edge of the pocket to form a locally outward-expanding form, but also realizes a smooth transition between different curved surfaces, and is especially conducive to the elimination of stress concentration, thereby avoiding material wear.

Those skilled in the art should understand that the various technical features of the present invention described above can be implemented independently or used in combination, without being limited by particular embodiments. Any changes or improvements to the cage and the roller bearing using the cage as described above shall fall within the scope of protection of the present invention, as long as they conform to the definitions of the attached claims.

The invention claimed is:

1. A one-way snap-in bearing cage, comprising:
    a substantially annular backbone, and
    a hanging-out portion extending from the backbone to one axial side, the hanging-out portion comprising pockets, which are distributed at intervals in a circumferential direction and used to accommodate spherical rollers, and pocket connections for connecting adjacent pockets, wherein the pocket employs a toroidal surface configured to oppose a rolling surface of the spherical roller, the toroidal surface having inner and outer radial ends and a radially middle location,
    wherein the pocket, at least in the vicinity of a radial inner edge at an opening side of the pocket, is configured such that a distance between the toroidal surface of the pocket and the rolling surface of the spherical roller increases when moving from the radially middle location of the toroidal surface toward the outer radial end.

2. The one-way snap-in bearing cage according to claim 1, wherein a radius Rt of a cross-sectional circle of the toroidal surface is 1.08-10 times a radius $R_w$ of the roller.

3. The one-way snap-in bearing cage according to claim 2, wherein the radius Rt of the cross-sectional circle of the toroidal surface is 1.15-5 times the radius $R_w$ of the roller.

4. The one-way snap-in bearing cage according to claim 3, wherein the radius Rt of the cross-sectional circle of the toroidal surface is 1.25-1.6 times the radius $R_w$ of the roller.

5. The one-way snap-in bearing cage according to claim 1, wherein a distance between a toroidal surface of the pocket and the spherical roller increases when moving from the radially middle location of the toroidal surface toward the outer radial end.

6. A roller bearing, comprising:
    an inner race,
    an outer race, and
    at least one line of rollers disposed between the inner and outer races,
    a one-way snap-in bearing cage having;
        a substantially annular backbone, and
        a hanging-out portion extending from the backbone to one axial side, the hanging-out portion comprising pockets, which are distributed at intervals in a circumferential direction and used to accommodate spherical rollers, and pocket connections for connecting adjacent pockets, wherein at least one of the pockets employs a toroidal surface configured to oppose a rolling surface of the spherical roller, the toroidal surface having inner and outer radial ends and a radially middle location of the toroidal surface,
    wherein the pocket, at least in the vicinity of a radial inner edge at an opening side of the pocket, is configured such that a distance between the toroidal surface of the pocket and the spherical roller increases when moving from the radially middle location toward the inner radial end, wherein
    the one-way snap-in bearing cage is disposed on one of the at least one line of rollers.

7. The one-way snap-in bearing cage according to claim 6, wherein a radius $R_t$ of a cross-sectional circle of the toroidal surface is 1.08-10 times a radius $R_w$ of the roller.

8. The one-way snap-in bearing cage according to claim 7, wherein the radius Rt of the cross-sectional circle of the toroidal surface is 1.15-5 times the radius $R_w$ of the roller.

9. The one-way snap-in bearing cage according to claim 8, wherein the radius Rt of the cross-sectional circle of the toroidal surface is 1.25-1.6 times the radius $R_w$ of the roller.

10. The one-way snap-in bearing cage according to claim 6, wherein a distance between a toroidal surface of the pocket and the spherical roller increases when moving from the radially middle location of the toroidal surface toward the outer radial end.

* * * * *